(12) United States Patent
Brownstone

(10) Patent No.: US 11,143,360 B2
(45) Date of Patent: Oct. 12, 2021

(54) ACCESSORY MOUNTING DEVICE

(71) Applicant: HORATIO BOOTSTRAP ENTREPRENEURS LLC, Northfield, IL (US)

(72) Inventor: Alan Scott Brownstone, Northfield, IL (US)

(73) Assignee: Horatio Booststrap Entrepreneurs LLC, Northfield, IL (US)

( * ) Notice: Subject to any disclaimer, the term of this patent is extended or adjusted under 35 U.S.C. 154(b) by 0 days.

(21) Appl. No.: 16/669,325

(22) Filed: Oct. 30, 2019

(65) Prior Publication Data

US 2020/0132249 A1    Apr. 30, 2020

Related U.S. Application Data

(60) Provisional application No. 62/753,463, filed on Oct. 31, 2018.

(51) Int. Cl.
| | | |
|---|---|---|
| *F16M 13/02* | (2006.01) | |
| *F16B 2/04* | (2006.01) | |
| *A47H 1/142* | (2006.01) | |

(52) U.S. Cl.
CPC ............. *F16M 13/022* (2013.01); *F16B 2/04* (2013.01); *F16M 13/027* (2013.01); *A47H 1/142* (2013.01)

(58) Field of Classification Search
CPC ...... A47H 1/142; A47H 1/144; F16M 13/022; F16M 13/027; A47K 10/04; A47K 10/14; A47K 2201/02; A47K 2201/025; A47K 2201/00; A47K 10/10; A47K 10/12; A47K 5/00; F16B 2/06

USPC ............ 248/220.21, 222.12, 222.51, 224.51, 248/222.11, 223.41, 220.22
See application file for complete search history.

(56) References Cited

U.S. PATENT DOCUMENTS

| | | | | |
|---|---|---|---|---|
| 2,623,573 | A | * 12/1952 | Di Gaetano | ............... B62J 1/06 280/283 |
| 4,211,404 | A | * 7/1980 | Blowsky | .......... A63B 21/00043 482/128 |
| 4,279,397 | A | * 7/1981 | Larsson | ............... A47B 95/008 108/152 |
| 4,398,639 | A | | 8/1983 | Daniels |
| 4,498,654 | A | | 2/1985 | Cooper |

(Continued)

FOREIGN PATENT DOCUMENTS

| | | |
|---|---|---|
| DE | 20 2016 106 464 U1 | 12/2016 |
| EP | 2 944 240 B1 | 4/2018 |
| EP | 2944240 B1 | 4/2019 |

OTHER PUBLICATIONS

International Search Report and Written Opinion, PCT/US2019/058933, dated Jan. 9, 2020.

*Primary Examiner* — Christopher Garft
(74) *Attorney, Agent, or Firm* — K&L Gates LLP

(57) ABSTRACT

An accessory mounting device for removably mounting an accessory or fixture to a wall, ceiling, or other supporting surface. The device includes a bracket or clip which is affixable to the wall or other surface. The device further includes a cover which releasably mounts to the bracket or clip. The cover is configured to support and anchor various accessories and devices to the wall, ceiling, or other surface. The cover is mounted to and removed from the bracket by overcoming a biasing force provided between members of the bracket.

24 Claims, 20 Drawing Sheets

(56) References Cited

U.S. PATENT DOCUMENTS

| | | | |
|---|---|---|---|
| 4,718,625 A * | 1/1988 | Boda | A47K 10/10 248/222.11 |
| 4,887,787 A * | 12/1989 | Friedrichs | A47K 1/09 248/551 |
| 5,026,013 A | 6/1991 | Robbins | |
| 5,121,893 A * | 6/1992 | King | E06B 9/323 160/902 |
| 5,186,426 A * | 2/1993 | Wada | E06B 9/323 16/94 R |
| 5,799,804 A | 9/1998 | Sharpe | |
| 6,520,463 B1 * | 2/2003 | Ouano | A47B 96/061 248/222.11 |
| 6,920,988 B1 | 7/2005 | Ratliff | |
| 7,641,161 B2 | 1/2010 | Bauer | |
| 7,703,500 B2 * | 4/2010 | Wen | E06B 9/323 160/84.05 |
| 7,980,798 B1 | 7/2011 | Kuehn et al. | |
| 8,308,117 B2 | 11/2012 | Braun | |
| 8,382,341 B2 | 2/2013 | Peter | |
| 8,474,770 B2 | 7/2013 | Reo et al. | |
| 8,646,626 B2 | 2/2014 | Hsu et al. | |
| 8,814,485 B2 | 8/2014 | Gleason | |
| 9,198,544 B1 | 12/2015 | Duddie | |
| 9,271,615 B1 | 3/2016 | Stephens | |
| D798,631 S * | 10/2017 | Kuo | D6/550 |
| 9,839,332 B2 * | 12/2017 | Austin, III | F16M 11/041 |
| D810,463 S * | 2/2018 | Kuo | D6/550 |
| 2008/0029665 A1 * | 2/2008 | Bauer | A47K 10/32 248/216.1 |
| 2008/0048079 A1 * | 2/2008 | Albritton | A47B 95/00 248/222.14 |
| 2009/0108157 A1 | 4/2009 | Spencer | |
| 2011/0266404 A1 * | 11/2011 | Hsu | A47K 10/18 248/222.14 |
| 2012/0067837 A1 * | 3/2012 | He | A47K 10/10 211/123 |
| 2014/0026402 A1 * | 1/2014 | Austin, III | A47K 10/04 29/700 |
| 2018/0028026 A1 * | 2/2018 | Austin, III | A47K 10/10 |
| 2018/0103809 A1 * | 4/2018 | Jones | A47K 10/10 |
| 2018/0252358 A1 * | 9/2018 | Yang | F16M 13/00 |
| 2018/0283604 A1 * | 10/2018 | Garcia | F16B 21/125 |
| 2019/0260865 A1 * | 8/2019 | Yang | F16M 11/041 |
| 2020/0080578 A1 * | 3/2020 | Wang | F16B 2/04 |
| 2020/0109812 A1 * | 4/2020 | Yang | F16M 13/00 |

* cited by examiner

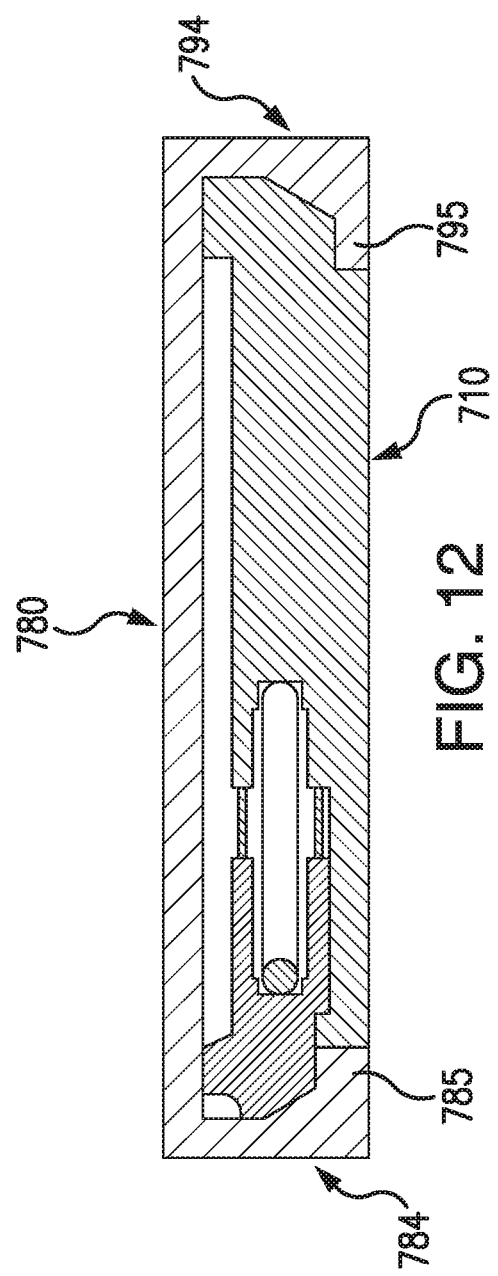

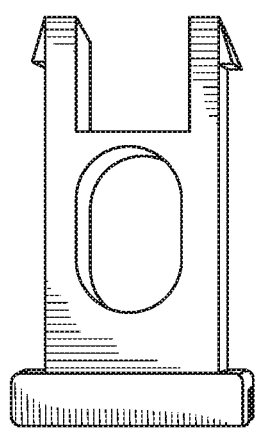
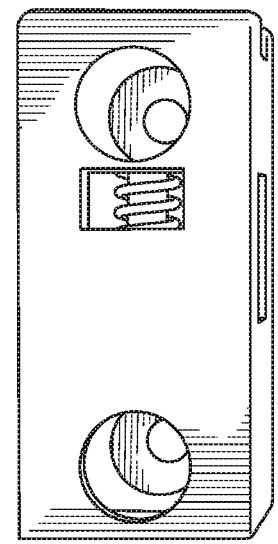
FIG. 26A        FIG. 26B
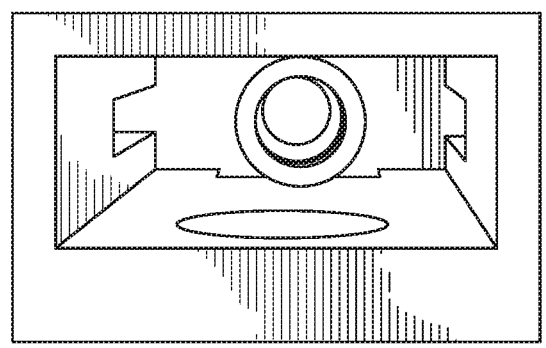
FIG. 27

ACCESSORY MOUNTING DEVICE

CROSS-REFERENCE TO RELATED APPLICATION(S)

This application claims the benefit of U.S. Provisional Application 62/753,463, filed Oct. 31, 2018, the entirety of which is herein incorporated by reference.

BACKGROUND OF THE INVENTION

A. Field of the Invention

The present invention relates to improved devices and methods for mounting fixtures and accessories to walls, ceilings, or other supporting surfaces. The fixtures and accessories can include those commonly used in residential settings and buildings, or alternatively can include those commonly used in industrial settings and buildings.

B. Description of the Related Art

Conventional wall mounting brackets include mounting hardware for coupling equipment or accessories to a wall or ceiling. The equipment can include, but is not limited to, light fixtures, handrails, cabinets, closet rods, and the like. These wall mounting brackets are commonly secured to walls by butterfly attachments or screws and the equipment is then attached to the wall mounting brackets by entering phlanges into female openings and pushing downward. Another common method is to attach the equipment to the wall using a small set screw located at the bottom of the equipment.

EP 2944240 A1 discloses a fixture for mounting an accessory to a wall wherein the mounting is preferably non-releasable but wherein a pin may be used to remove the accessory from the fixture if releasability is desired. U.S. Pat. No. 6,520,463 discloses a mounting bracket for a wall mounted accessory wherein many different mechanical components and sections of the bracket and accessory engage during mounting of the accessory. Improvements are needed with these and other designs in order to allow for quicker, more secure and more convenient mounting and removal of a device to a wall, ceiling or supporting surface.

There still remains a need for a bracket or clip which can be easily secured to a flat surface and which allows a device to be quickly and releasably attached to the bracket or clip. Furthermore, there is a need for a bracket or clip which does not require a set screw for securing the device or reduces such needs. Other needs or advantages are also contemplated.

SUMMARY OF THE INVENTION

According to principles of the invention, accessory mounting devices and components (including related methods), are provided. For example, an accessory mounting device comprises a bracket having a fixed first member which includes a lower surface configured and dimensioned to conform to a wall or ceiling surface, the bracket having a movable second member spaced from the first member by a distance when in a first position, wherein the second member is biased toward the first position by a biasing force but is movable toward the first member by at least partially overcoming the biasing force to reduce the distance between the first second members.

The bracket further comprises a track for receiving therein the second member of the bracket, and a stop member for preventing further movement of the second member of the bracket towards the first member of the bracket beyond a predetermined point.

The bracket further comprises a spring that provides the biasing force and wherein compression of the spring moves the second member of the bracket to reduce the distance between the first and second members of the bracket.

The spring may be a coil spring, with the bracket further comprising a stop member for preventing further movement of the second member of the bracket towards the first member of the bracket beyond a predetermined point, and the stop member and the second member of the bracket each include a horizontal slot in which the spring resides.

Advantageously, the lower surface of the first member of the bracket is relatively flat and the first member of the bracket extends away from the lower surface at an acute angle.

The first and second members of the cover each includes an angled inner side, each angled side extending away from the respective member, wherein the first and second members of the cover respectively engage the first and second members of the bracket when the biasing force is restored to releasably lock the cover onto the bracket.

The first and second members of the cover each may include an angled inner side, each angled side extending away from the respective member with the angled inner sides configured and dimensioned to respectively engage the first and second members of the bracket to lock the cover onto the bracket.

The device typically includes a cover that is operatively associated with the bracket, the cover having an upper surface, a lower surface, and a structure for supporting, hanging or mounting an accessory, the cover having a fixed first member extending away from the lower surface at a first position on the cover, and the cover having a fixed second member extending away from the lower surface at a second position on the cover, with the second member of the cover spaced by a predetermined distance from the first member of the cover, and with the predetermined distance being essentially the same as the distance between the first member of the bracket and the second member of the bracket when in the first position. The cover is attachable to the bracket by urging one of the fixed members of the cover against the second member of the bracket to overcome the biasing force and reduce the distance between the first member of the bracket and the second member of the bracket so that the one of the fixed members of the cover is positioned adjacent the second member of the bracket and the other of the fixed members of the cover is positioned adjacent the first member of the bracket when the cover is secured to the bracket, with the biasing force maintaining each member of the cover in contact with the respective member of the bracket when the cover is secured to the bracket.

The cover is configured to completely surround the bracket to provide an ornamental feature when the cover is secured thereto. The first and second members of the cover each advantageously include an angled inner side, each angled side extending away from the respective member, wherein the first and second members of the cover respectively engage the first and second members of the bracket when the biasing force is restored to releasably lock the cover onto the bracket. The first and second members of the cover each includes an angled inner side, each angled side extending away from the respective member with the angled inner sides configured and dimensioned to respectively engage the first and second members of the bracket to further lock the cover onto the bracket.

The cover may include a structure configured to engage an accessory. For optimum support of the cover structure, the first and second members of the cover have inwardly facing protrusions and the first and second wall members of the bracket have open slots or channels that are configured and dimensioned to receive the protrusions of the first and second members of the cover to lock the cover onto the bracket.

Some embodiments relate to a method of supporting, hanging or mounting an accessory on a wall or ceiling, which comprises providing any of the devices disclosed herein with a selected accessory; affixing the bracket to the wall or ceiling; attaching the cover to the bracket; and supporting, hanging or mounting the accessory on the structure of the cover of the device.

The bracket may be secured to the wall or ceiling with screws, moly bolts, nails or with a permanent or removable adhesive.

Embodiments of the present invention allows quicker and simpler mounting of a device onto a bracket than conventional wall mounting brackets, thus shortening the amount of time required to mount the device to the wall. This time-saving is especially important in the construction industry where subcontractors' time in installation is critical. In industries and settings such as this, providing a quick and easy mounting system for devices and accessories is most cost-effective. It is a further object of this invention to allow persons not in the construction business, i.e., do-it-yourself-ers, to attach a device to a wall or ceiling quickly and without much effort. There is also a need for a bracket or clip which allows mounting of a device without scraping or otherwise damaging the surface to which it is affixed.

BRIEF DESCRIPTION OF THE DRAWINGS

The nature and various advantages of the present invention will become more apparent upon consideration of the following detailed description, taken in conjunction with the accompanying drawings, and in which:

FIG. 12 is a cross-sectional view of a cover mounted onto the bracket using a more secure arrangement;

FIGS. 26A-26B are front views of the movable second member and the fixed first member of the bracket of FIG. 22, respectively, when they are separated;

FIG. 27 is a top view of the fixed first member of the bracket of FIG. 22;

DETAILED DESCRIPTION OF THE INVENTION

Figure 1:
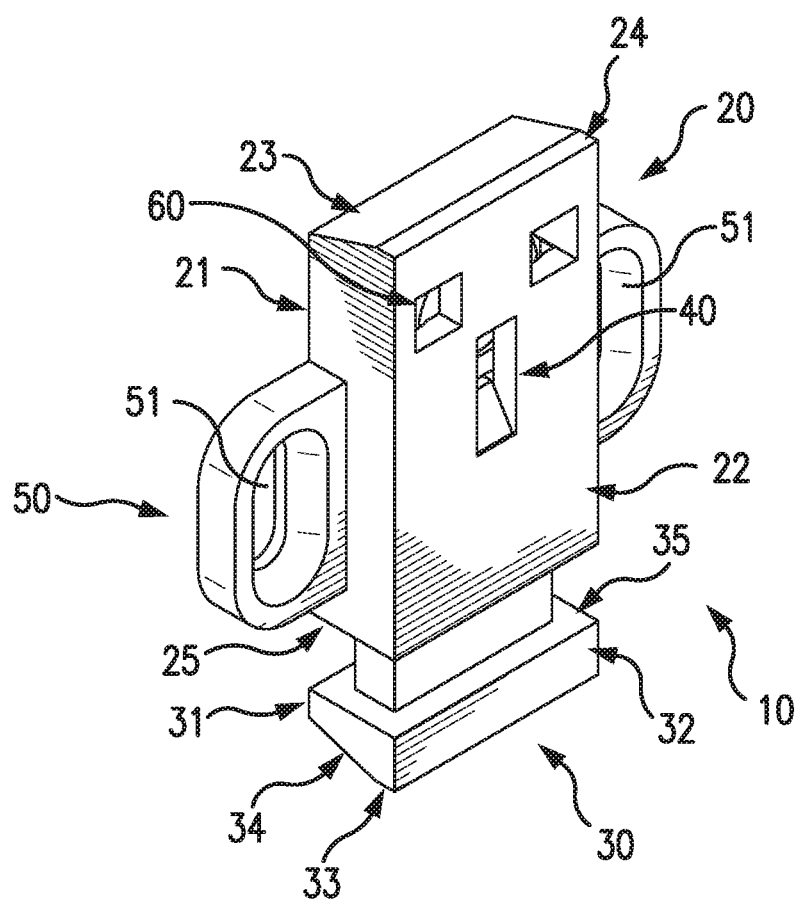
FIG. 1 is a perspective view showing a bracket of the present invention in an initial, biased position according to an embodiment of the present invention.

The present invention will be clearer from the following description when viewed together with the accompanying drawings, which show, for purpose of illustration only, some embodiments in accordance with the present invention. It is to be understood that the present invention is not limited in its application to the details of construction and arrangement of components set forth in the following description or illustrated in the drawings. The present invention is capable of other embodiments and of being practiced or carried out in various ways other than those expressly shown or described.

Referring to FIG. 1, a mounting bracket or clip 10 of an embodiment of the invention is depicted. The mounting bracket 10 includes a fixed first member 20 and a movable second member 30 spaced from the fixed first member 20 by a distance which varies based on the position of the movable second member 30. As will be discussed in more detail in reference to FIGS. 6 to 8, the movable second member 30 is biased by a biasing force towards an initial position as shown in FIG. 1 and is movable towards the fixed first member 20 by at least partially overcoming the biasing force to allow for quick and easy mounting of a cover onto the mounting bracket 10. The biasing force may be provided by any suitable form of biasing member or mechanism. In the embodiments disclosed herein, the biasing force is provided by a compression spring 60, as discussed in more detail below.

Figure 2A:
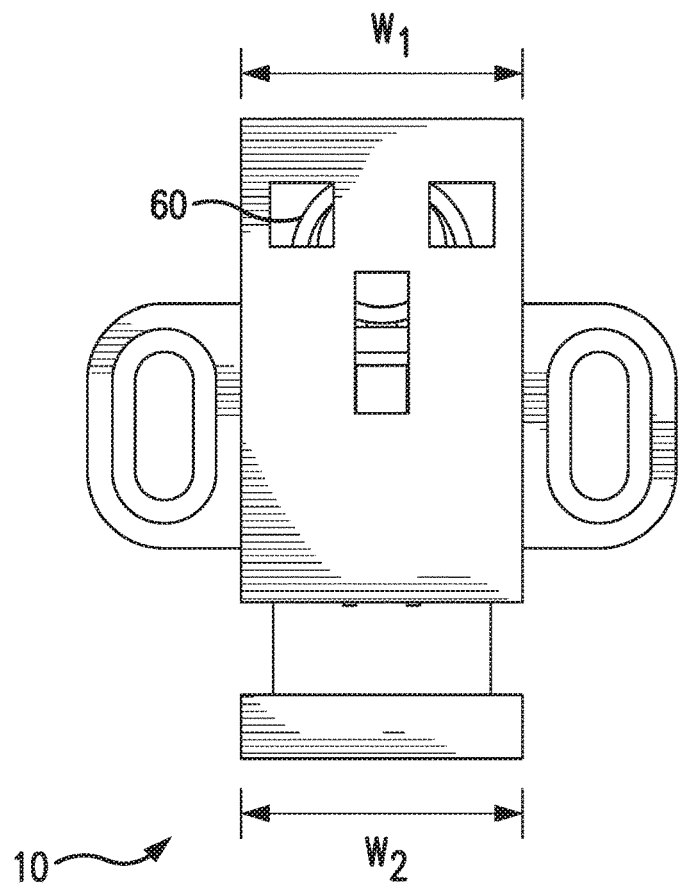
FIG. 2A is a front view showing the bracket of FIG. 1 in the initial, biased position.

The fixed first member 20 includes a substantially planar lower surface 21 that is configured and dimensioned to conform to and be mounted to a wall surface, a ceiling surface, or any other supporting surface. The movable second member 30 includes a substantially planar lower surface 31 that is substantially in-line with, or substantially extending along the same axis as, the lower surface 21 of the fixed first member 20. The fixed first member 20 includes a substantially planar upper surface 22 and the movable second member 30 includes a substantially planar upper surface 32, with the upper surface 22 of the fixed first member 20 being substantially in-line with, or substantially extending along the same axis as, the upper surface 32 of the movable second member 30. The upper surface 22 of the fixed first member 20 includes one or more openings 40 for viewing the internal components of the mounting bracket assembly 10. In the embodiment shown in FIG. 1, there are three rectangular openings 40 shown, but any number and shape of openings may be provided. As shown in FIG. 2A, the width W1 of the fixed first member 20 is substantially equal to the width W2 of the movable second member 30.

The fixed first member 20 further includes a first end side comprised of a first surface 24 and a second, angled surface 23. The second, angled surface 23 extends away from the first surface 24 at an oblique angle, with the angle preferably being an acute angle between 30 degrees and 90 degrees. The fixed first member 20 further includes a second end side comprised of a first surface or face 25. The movable second member 30 further includes a first end side comprised of a first surface 35, with the first surface 35 of the first end side of the movable second member 30 preferably being substantially parallel to the first surface 25 of the second end side of the fixed first member 20. The movable second member 30 further includes a second end side comprised of a first surface 33 and a second, angled surface 34. The second, angled surface 34 extends away from the first surface 33 at an oblique angle, with the angle preferably an acute angle between 30 degrees and 90 degrees. This generally would be the same as angled surface 23 but it can also be different if desired. Preferably, the first surface 24 of the first end side of the fixed first member 20 is substantially parallel to the first surface 33 of the second end side of the movable second member 30. Additionally, the second, angled surface 23 of the first end side of the fixed first member 20 preferably extends away from the first surface 24 at substantially the same angle that the second, angled surface 34 of the second end side of the movable second member 30 extends away from the first surface 33.

The mounting bracket 10 may further include at least one mounting member 50 extending from at least one side of the fixed first member 20. Preferably, there is at least one mounting member 50 extending from each lateral side of the fixed first member 20. The mounting member 50 may comprise one or more extensions or phlanges with one or more recesses or slots 51 for receiving one or more fixing devices that engage with the supporting surface including but not limited to screws, bolts, adjustable clips, or any other fastener configured and shaped to fit within the shape of the recesses or slots. The extensions or protrusions and the recesses or slots 51 may comprise a shape including but not limited to circular, semi-circular, oval, rectangular, triangular, and arcuate. The mounting members 50 allow the bracket 10 to be releasably and securely mounted to the wall, ceiling, or other supporting surface, and also allow for adjustment of the bracket to ensure that it is level.

Figure 2B:
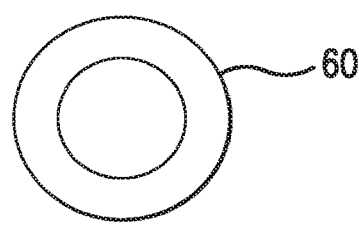
FIG. 2B is a view of a round spring for use in the bracket of FIG. 2A.
Figure 2C:
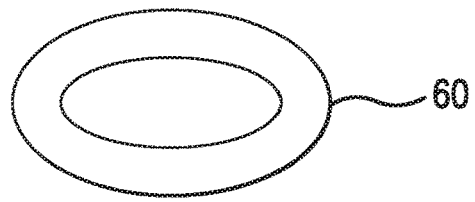
FIG. 2C is a view of an oval spring for use in the bracket of FIG. 2A.
Figure 2D:
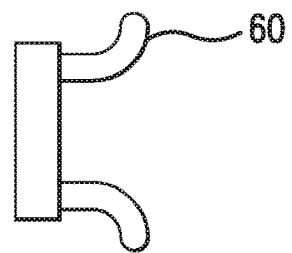
FIG. 2D is a view of a mustache-shaped spring for use in the bracket of FIG. 2A.

In the mounting bracket 10 of FIGS. 1 and 2A, the biasing force is provided by a spring 60. This spring can be a round spring as shown in FIG. 2B, an oval spring as shown in FIG. 2C, or a winged or mustache-shaped spring as shown in FIG. 2D. Each spring fits within a recess or compartment in the bracket between the movable second member and a wall of the compartment. Movement of the movable second member 30 toward the fixed first member 20 compresses the spring to allow connection of the cover member while after the parts are engaged, the spring moves the movable second member away from the fixed first member to lock the cover onto the bracket. The biasing force may be changed by replacing the spring with another spring of different strength or by using multiple springs.

The bracket 10 may be oriented in any particular direction on a ceiling or wall. When mounted on a wall, it is convenient for the bracket 10 to be oriented vertically with the movable second member 30 facing upwardly as that facilitates attachment of the cover member.

Figure 3:
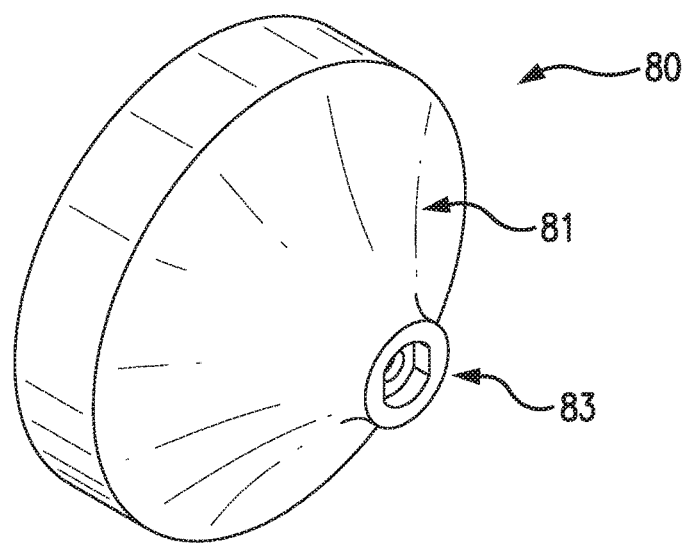
FIG. 3 is a perspective view showing a front of a cover of the present invention according to an embodiment of the present invention.
Figure 4:
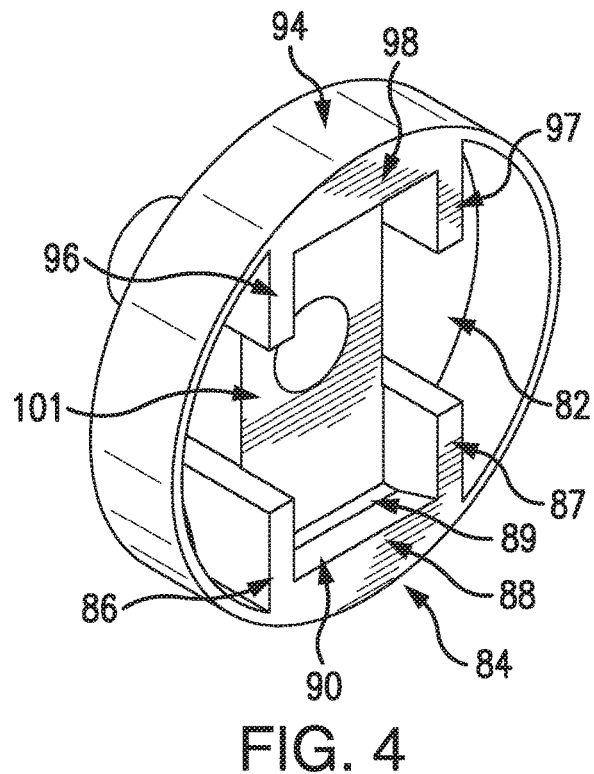
FIG. 4 is a perspective view showing a rear of the cover of FIG. 3.
Figure 5:
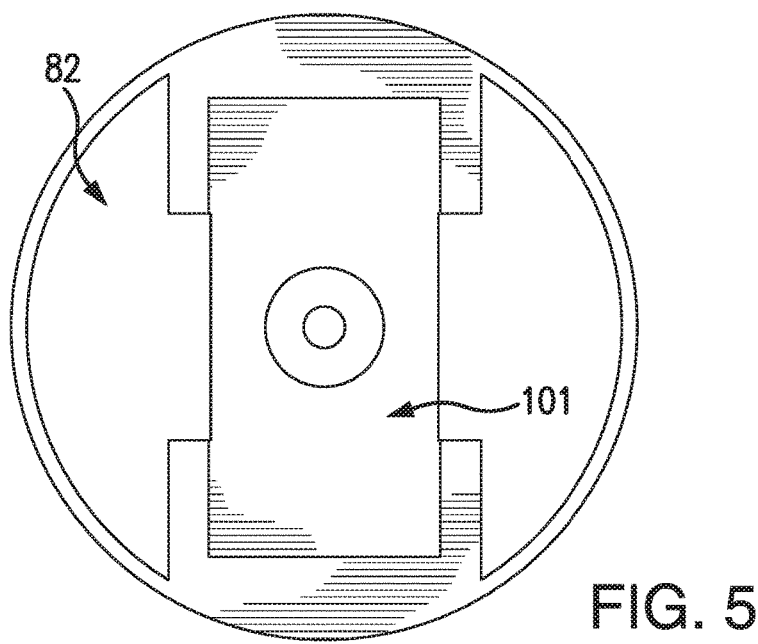
FIG. 5 is a rear view showing the cover of FIG. 3.

Referring to FIGS. 3 to 5, different views of a cover 80 according to one embodiment of the present invention are shown. The cover 80 includes an upper surface 81, a lower surface 82, and a mounting mechanism 83 for attaching a structure, which is configured for supporting, hanging or mounting an accessory, to the cover 80. In FIG. 3, the mounting mechanism 83 is formed on the upper surface 81 and includes a recess for receiving an end of a fixture or accessory. However, the mounting mechanism 83 may alternatively include any other engagement or mounting mechanism including, but not limited to, one or more clips, a rings, slots, threaded or friction-fit openings, and multiple recesses. The structure which engages the mounting mechanism 83 may include, but is not limited to, a rod, a rod with a cap that includes a depression for receiving a bar, a rod with a cap that includes an aperture for receiving an arcuate or polygonal ring, or a wire, filament, rope or cable support. The mounting mechanism 83 may be a hole or protrusion, include a combination of a hole and a protrusion, or be a structure configured to engage an accessory or an intermediary device used to connect an accessory.

Referring to FIGS. 4 to 5, the lower surface 82 is shown in more detail. The cover 80 further includes a fixed first member 84 and a fixed second member 94, both of which project from the lower surface 82. The fixed first member 84 and fixed second member 94 may also be referred to as the front portion and rear portion of the lower surface 82, respectively. The fixed first member 84 includes a first lateral portion 86, a second lateral portion 87, and a connecting portion 88. The connecting portion 88 includes one or more surfaces for engaging with one or more surfaces of either the fixed first member 20 or the movable second member 30 of the bracket 10, to allow for quick and releasable mounting of the cover 80 onto the bracket 10.

Figure 6:
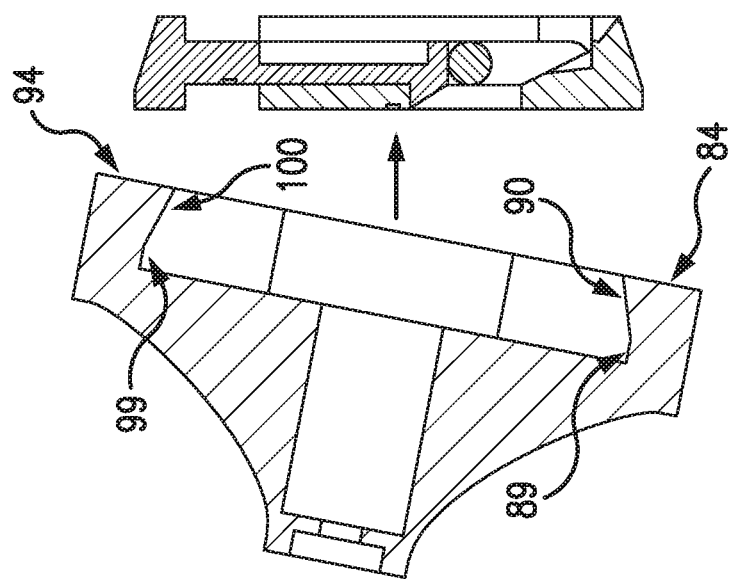
FIG. 6 is a cross-sectional view showing the mounting of the cover onto the bracket.

In FIGS. 4 and 6, the connecting portion 88 includes a first surface 89 and a second surface 90 that is at an oblique angle relative to the first surface 89. The first surface 89 could have an angle of 90 degrees when connected to the bracket as it provides additional locking of the cover to the bracket. Preferably, the second surface 90 extends away from the first surface 89 at an acute angle that corresponds to that of the bracket. The fixed second member 94 has the same structural components and configuration as the fixed first member 84 including a first lateral portion 96, a second lateral portion 97, and a connecting portion 98 with a first surface 99 and a second surface 100 that is at an oblique angle relative to the first surface 99, shown more clearly in FIGS. 6 to 8. In one embodiment, the second surface 100 extends away from the first surface 99 at an acute angle that is different from the angle formed by surfaces 89 and 90. In another embodiment, the cover 80 is symmetric about a center point such that the fixed first member 84 and the fixed second member 94 are mirror images of each other and the second, angled surface of each fixed member extends away from the first surface of each fixed member at substantially the same angle. The cover 80 further includes a recess 101 between the fixed first member 84 and the fixed second member 94 which is sized and configured to snugly receive the bracket 10.

Figure 8:
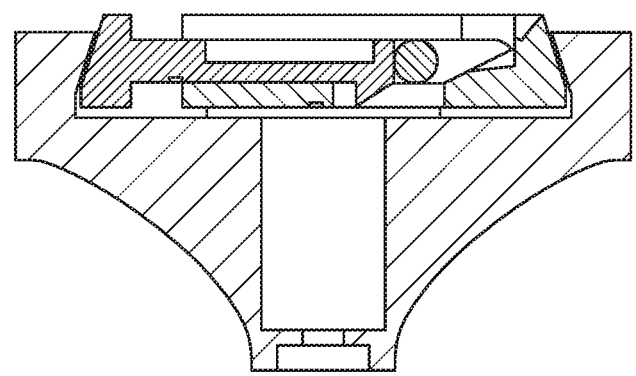
FIG. 8 is yet another cross-sectional view showing the mounting of the cover onto the bracket.
Figure 7:
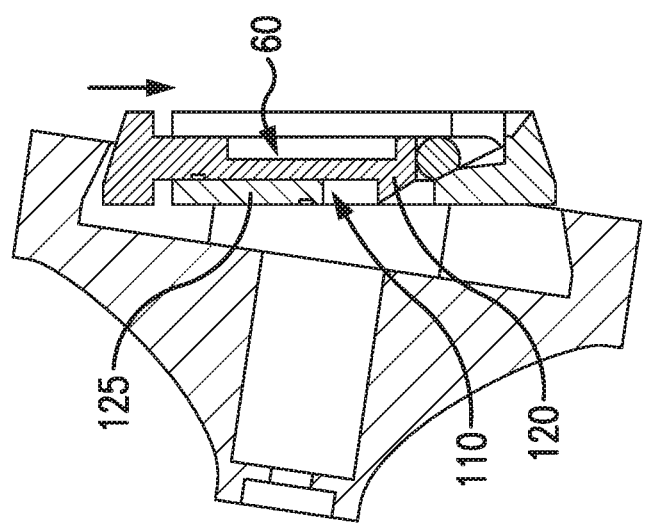
FIG. 7 is another cross-sectional view showing the mounting of the cover onto the bracket.

Referring to FIGS. 6 to 8, the mounting of the cover 80 onto the bracket 10 will now be described in more detail. As shown in FIG. 7, the initial contact between the cover 80 and the bracket 10 occurs between the movable second member 30 of the bracket 10 and either the fixed first member 84 or the fixed second member 94 of the cover 80. Because the fixed first member 84 or the fixed second member 94 of the cover 80 are preferably mirror-images of one another, either fixed first member 84 or fixed second member 94 may engage the movable second member 30 of the bracket 10, and either fixed first member 84 or fixed second member 94 may engage the fixed first member 20 of the bracket 10. As one of the fixed members of the cover 80 engages the movable second member 30, the user applies additional force to at least partially overcome the biasing force of the spring 60 and move the movable second member 30 towards the fixed first member 20. As the movable second member 30 moves towards the fixed first member 20, the movable second member 30 is received and slides within a track or slot 110 of the fixed first member 20.

The movable second member 30 also includes a stop member 120 for preventing further movement of the fixed first member 20 once it reaches a certain predetermined point where it contacts a wall member 125. As the biasing force is overcome and the spring becomes compressed, a user is then able to engage the other fixed member (i.e., the fixed member not already engaging with the movable second member 20) of the cover 80 with the fixed first member 20 of the bracket. In doing so, the bracket 10 is able to be positioned within the recess 101 of the cover 80 and once the user stops applying pressure to the movable second member 30, the spring expands to snugly secure the bracket 10 within the cover 80 as shown in FIG. 8.

The bracket 10 and the cover 80 are designed such that when the cover 80 is disposed around the bracket 10, each of the angled surfaces 90, 100 of the fixed members 84, 94 of the cover 80 engages and is parallel to the corresponding angled surface of the fixed first member 20 and the movable second member 30. The multiple corresponding angle surfaces between the cover 80 and the bracket 10 allow for the bracket 10 to more easily slide into the recess 101 of the cover 80 and allow for a tighter friction fit when the cover 80 is disposed around the bracket 10. This helps prevent inadvertent removal of the cover 80 from the bracket 10. In this embodiment, the surface 24 of the fixed first member 20 and the surface 33 of the movable second member 30 may come into contact with surfaces 89, 99 of the fixed first and second members 84, 94 of the cover 80 when the cover 80 is fully mounted onto the bracket 10 for providing a more secure friction fit, or alternatively spacing may be provided between these respective surfaces when the cover 80 is fully mounted onto the bracket 10. The bracket 10 and the cover 80 are preferably designed and dimensioned such that the cover 80 is spaced from the wall or ceiling surface and does not directly engage the wall or ceiling surface when the cover 80 is mounted to the bracket 10. This spacing helps prevent damage to the wall or ceiling as the cover 80 is mounted to and removed from the bracket 10, and also allows for easier mounting and removal of the cover 80 due to there being no friction between the cover 80 and the wall or ceiling surface during mounting and removal. Additionally, the cover 80 is configured to completely surround the bracket 10 to provide an ornamental feature (e.g., such that the bracket 10 is not visible) when the cover 80 is secured thereto.

To remove the cover 80 from the bracket 10, the user simply applies pressure to the side of the cover 80 that is disposed adjacent to the movable second member 30. This force overcomes the biasing force of the spring 60 and moves the movable second member 30 towards the fixed first member 20, decreasing the overall length of the bracket 10 and allowing the cover 80 to be easily and quickly removed from the bracket 10.

Figure 9A:
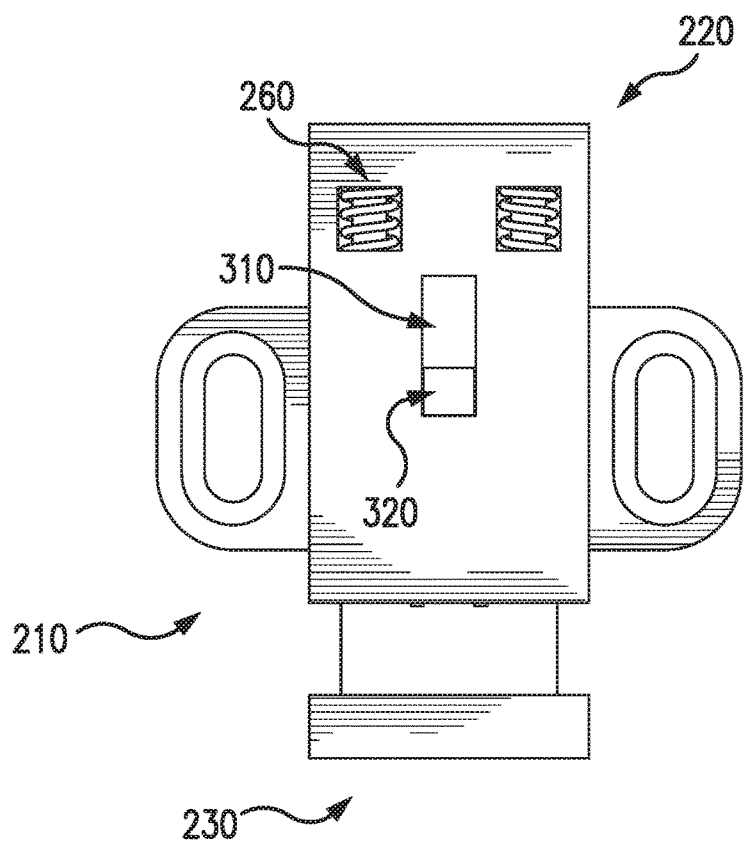
FIG. 9A is a front view showing a bracket of the present invention in an initial, biased position according to another embodiment of the present invention.
Figure 9B:
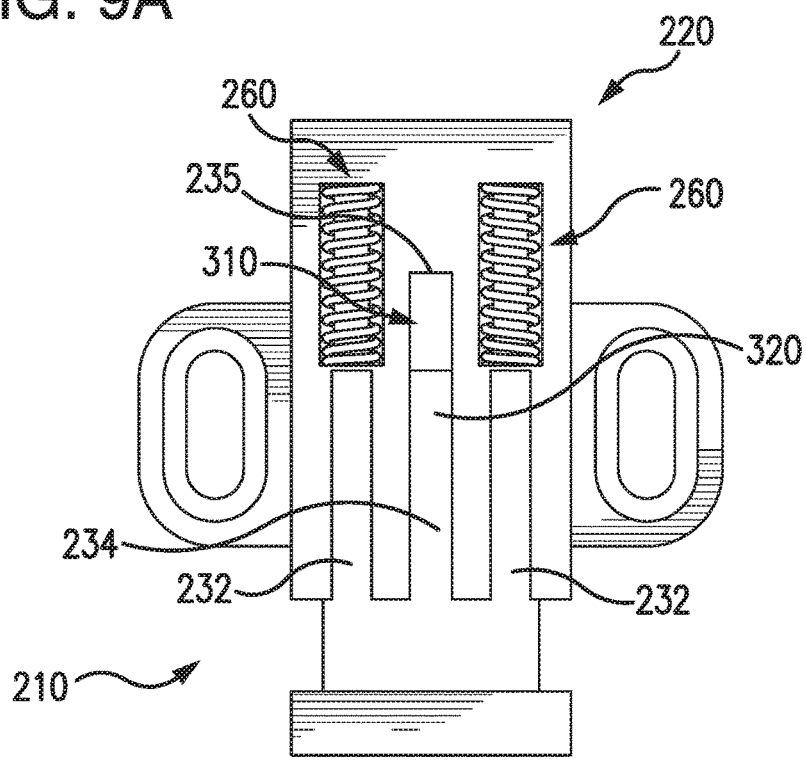
FIG. 9B is a rear view of the bracket of FIG. 9A.

Referring to FIGS. 9A and 9B, another embodiment of a bracket 210 of the present invention is shown. Bracket 210 includes multiple springs 260, with two springs being shown. The springs 260 may comprise coiled compression springs which extend substantially parallel to provide the biasing force to the movable second member 230. Bracket 210 functions in the same manner as the bracket 10, with a user mounting the cover onto the bracket 210 by applying force from the cover to the movable second member 230 to at least partially overcome the biasing force of springs 260 and move the movable second member 230 towards the fixed first member 220. The fixed first member 220 of bracket 210 further includes a recess, slot, or track 310 for receiving at least a portion, preferably in the form of a protrusion or extension 320, of the movable second member 230, the protrusion 320 also serving as a stop member 320 for preventing further movement of the movable second member 230 once it reaches a certain predetermined point, such as at wall member 235 shown in FIG. 9B. Movable second member 230 includes three legs with the two outer legs 232 contacting the springs and an inner leg 234 which carries the protrusion 320 that travels in slot 310. Additionally, or alternatively, the end or side of the fixed first member 220, which prevents further movement of the movable second member 230 by engaging the movable second member 230, also serves as a stop member. A track or slot 310 includes a rectangular section for receiving a rectangular portion of the movable second member 230. The rectangular portion of the movable second member 230 is configured to travel within the track or slot 310 and abut a stop member 235 in the form of the end of the track or slot 310 to prevent further movement of the movable second member 230 beyond a predetermined point.

Figure 10A:
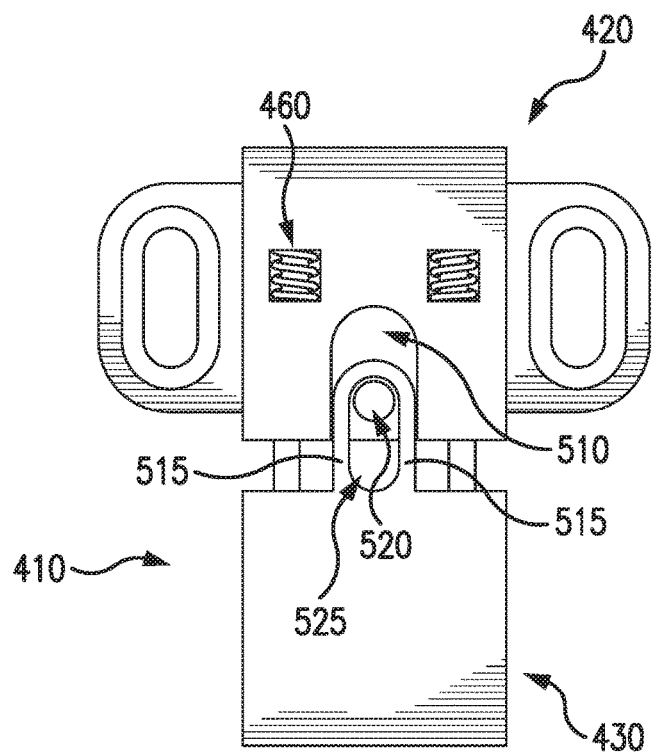
FIG. 10A is a front view showing a bracket of the present invention in an initial, biased position according to another embodiment of the present invention.
Figure 10B:
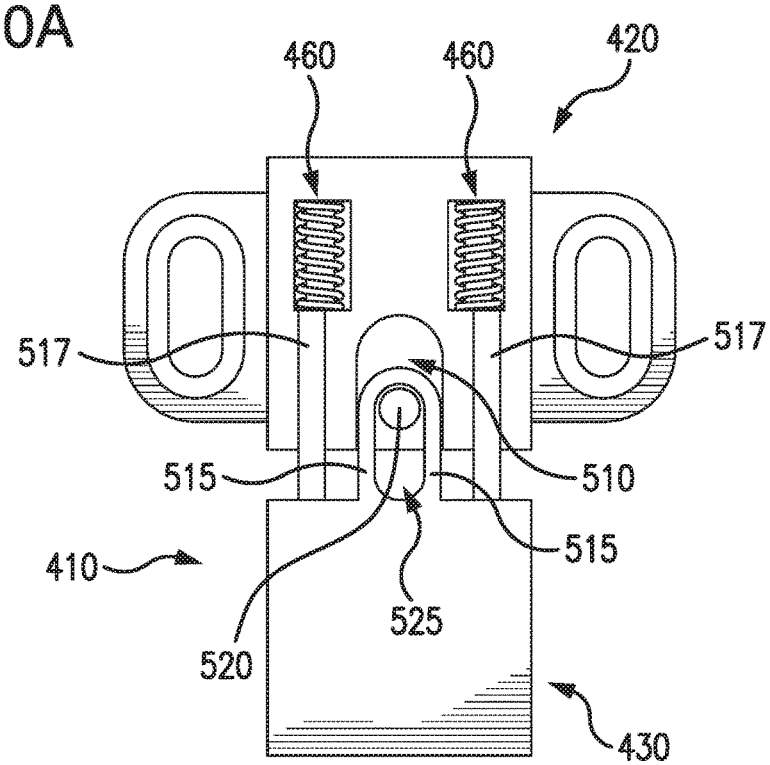
FIG. 10B shows a rear view of the bracket of FIG. 10A.

Referring to FIGS. 10A and 10B, another embodiment of a bracket 410 of the present invention is shown. Bracket 410 includes multiple springs 460, with two springs 460 being shown in FIG. 10A. The springs 460 may comprise compression springs which extend substantially parallel to provide the biasing force to the movable second member 430. Bracket 410 functions in the same manner as the bracket 10, with a user mounting the cover onto the bracket 410 by applying force from the cover to the movable second member 430 to at least partially overcome the biasing force of springs 460 and move the movable second member 430 towards the fixed first member 420. The fixed first member 420 of bracket 410 further includes a recess, slot, or track 510 for receiving at least a portion of the movable second member 430, and also includes a stop member 520 for preventing further movement of the movable second member 430 once it reaches a certain predetermined point. The track 510 includes a rounded or arcuate portion for receiving a rounded or arcuate portion of the movable second member 430. The movable second member 430 includes alignment rods 515 surrounding an opening 525 that surrounds the stop member 520 to assure that the second movable member 430 moves linearly. The arcuate or rounded portion of the movable second member 430 is configured to at least partially surround or receive the stop member 520 in a recess of the movable second member 430. Additionally, or alternatively, the end or side of the fixed first member 420, which prevents further movement of the movable second member 430 by engaging the movable second member 430, also serves as a stop member. The second movable member 430 also includes a plurality of legs 517 that exert force on the springs 460 when the second movable member 430 is compressed. The same recess 510 may accommodate the legs 517, or the fixed first member 420 may include other recesses to accommodate the legs 517.

Figure 11A:
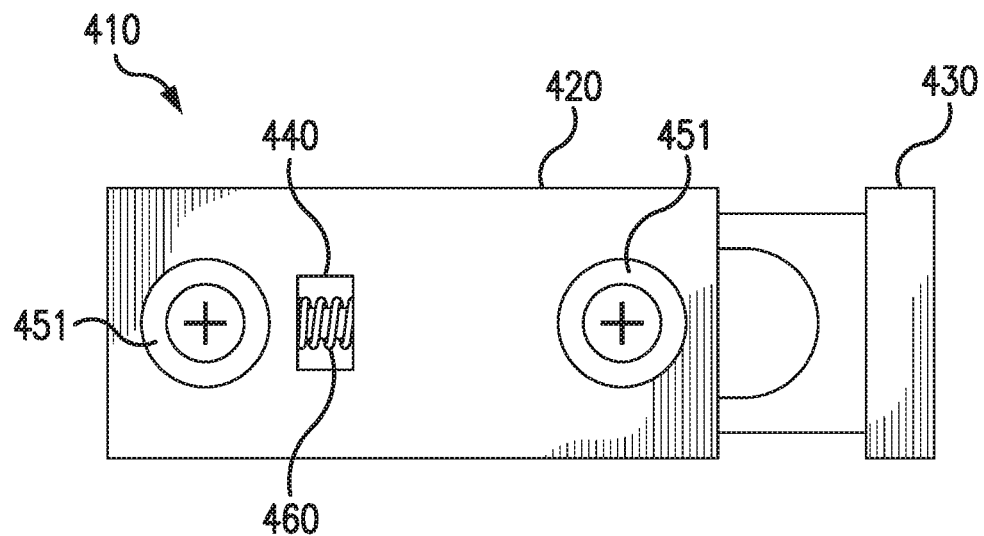
FIG. 11A is a front view of a bracket of the present invention in an initial, biased position according to another embodiment of the present invention.
Figure 11B:
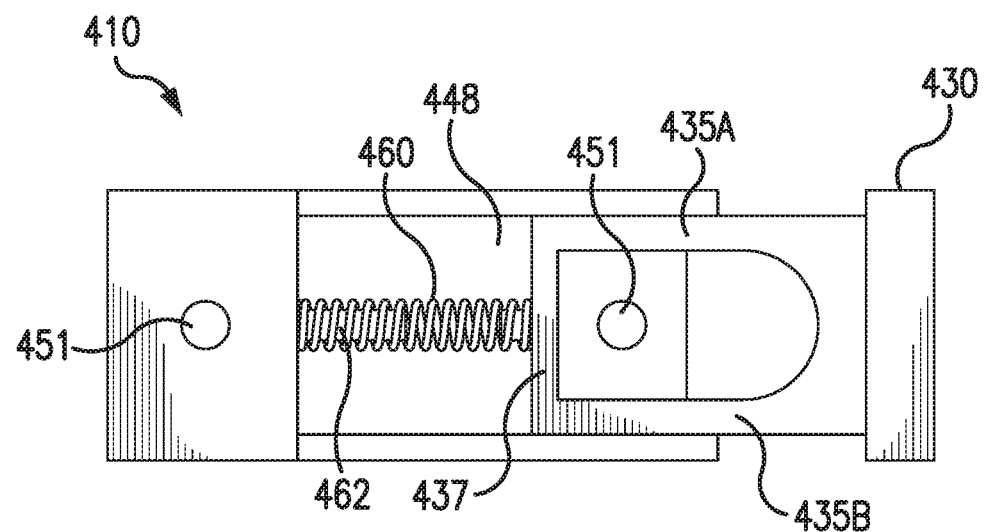
FIG. 11B a rear view of the bracket of FIG. 11A.

FIGS. 11A and 11B shows another embodiment of a bracket 410 of the present invention. This is a more compact form where the mounting screw openings 451 are shown in the bracket instead of as appendages attached to the bracket. In this embodiment, the bracket 410 includes a single spring 460. The spring 460 may comprise a coiled compression spring to provide the biasing force to the movable second member 430. The bracket 410 functions in primarily the same manner as the bracket 10, with a user mounting the cover onto the bracket 410 by applying force from the cover to the movable second member 430 to at least partially overcome the biasing force of the spring 460 and move the movable second member 430 towards the fixed first member 420. The fixed first member 420 includes a post 462 on which the spring sits. The fixed first member 420 further includes one or more recesses, slots, rails, or tracks 448 for receiving at least a portion of the movable second member 430. The use of such a configuration guides the movement of the movable second member 430 towards and away from the fixed first member 420. The movable second member 430 includes a plurality of legs 435A, 435B and a stop member 437 connecting the legs 435A, 435B. The use of one or more recesses 448 guides the movement of one or more of the legs 435A, 435B of the movable second member 430 into one or more recesses 448. The stop member 437 prevents further movement of the movable second member 430 toward the fixed first member 420 when engaged with interior wall of the fixed first member 420. Although the mounting screw openings 451 are shown as circular, they instead can be oval or in the form of a slot to facilitate adjustments when mounting the bracket. Additionally, while a respective mounting screw opening 451 is shown on each side of opening 440, the number and position of the mounting screw openings 451 may be varied. For example, there may be only a single mounting screw opening 451 in the bracket housing, or there may be two or more mounting screw openings on each side of opening 440. Although the mounting screw openings are shown as circular, they instead can be oval or in the form of a slot to facilitate adjustments when mounting the bracket.

FIG. 12 illustrates a modified version of the cover and bracket of FIGS. 6 to 8. The process of mounting of a cover 780 onto the bracket 710 is primarily the same as that described above in reference to bracket 610 of FIGS. 6 to 8. The cover 780 is modified in that it includes an elongated protrusion 785, 795 on the fixed members 784, 794 that engages a similarly configured channel or slot on each receiving wall side of the bracket 710. The engagement of the protrusion into the channel provides a more secure locking of the cover 780 to the bracket 710 which may be desirable for applications where the cover and bracket are used to support heavier items that are to be mounted on the wall or ceiling.

Figure 13:
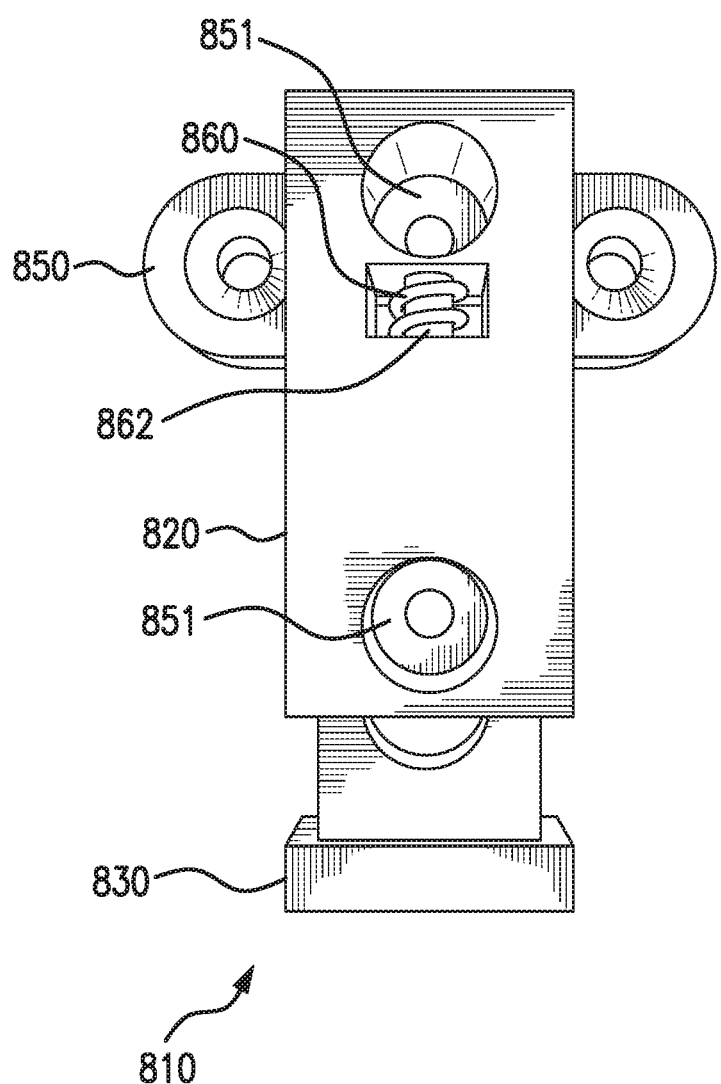
FIG. 13 is a front view showing a bracket of the present invention in an initial, biased position according to another embodiment of the present invention.
Figure 14:
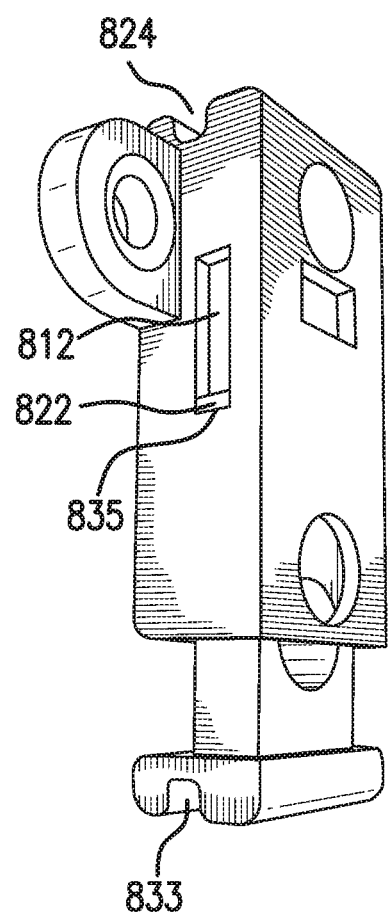
FIG. 14 is a front perspective view showing the bracket of FIG. 13.
Figure 15:
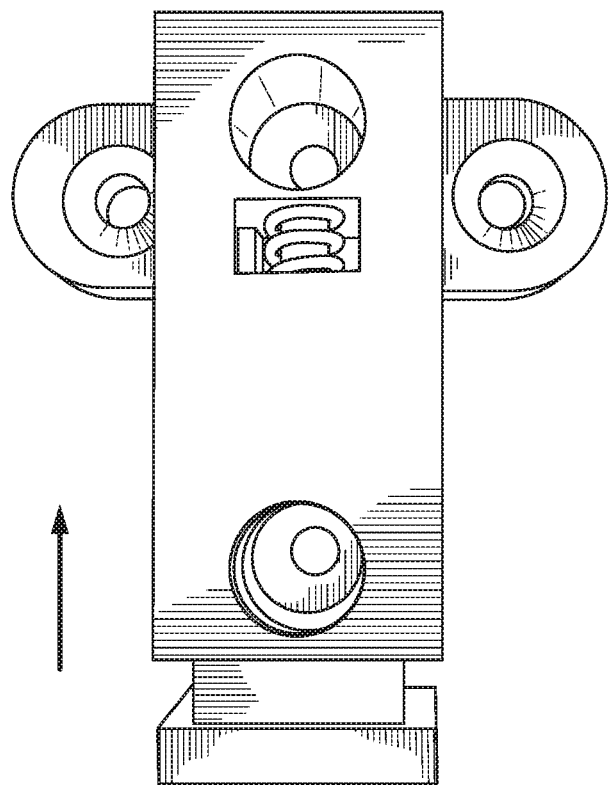
FIG. 15 is a front view of the bracket of FIG. 13 showing the movable second member overcoming the biasing force of the spring and moving towards the fixed first member.

Referring to FIGS. 13-18, another embodiment of the bracket 810 is shown. Bracket 810 includes a spring 860. The spring 860 may be a coiled compression spring which acts as a biasing force between the fixed first member 820 and the movable second member 830. Bracket 810 functions in primarily the same manner as the bracket 10, with a user mounting the cover 900 shown in FIG. 19 onto the bracket 810 by applying force from the cover to the movable second member 830 to at least partially overcome the biasing force of the spring 860 and move the movable second member 830 towards the fixed first member 820. FIGS. 13-14 show the bracket 810 in an initial, biased position.

Figure 16:
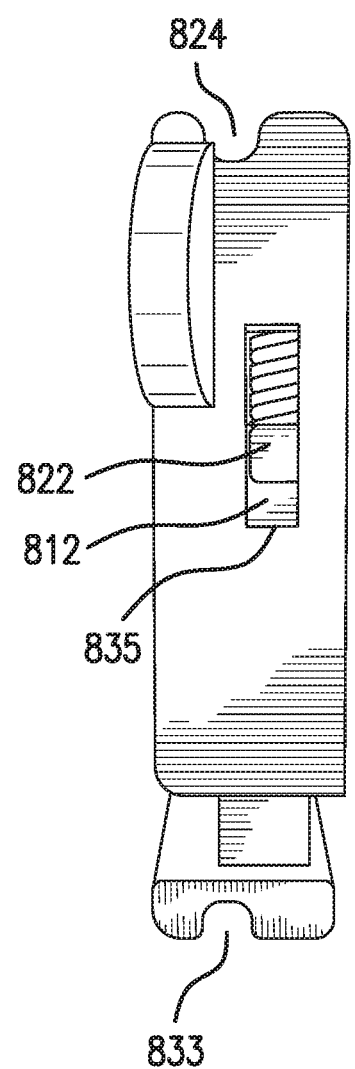
FIG. 16 is a side view of the bracket of FIG. 13 showing the movable second member overcoming the biasing force of the spring and moving towards the fixed first member.
Figure 17A:
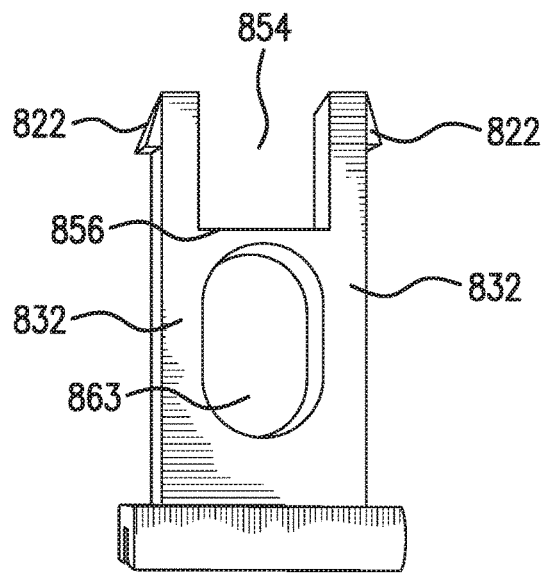
FIGS. 17A-17B are front views of the movable second member and the fixed first member of the bracket of FIG. 18, respectively, when they are separated.
Figure 17B:
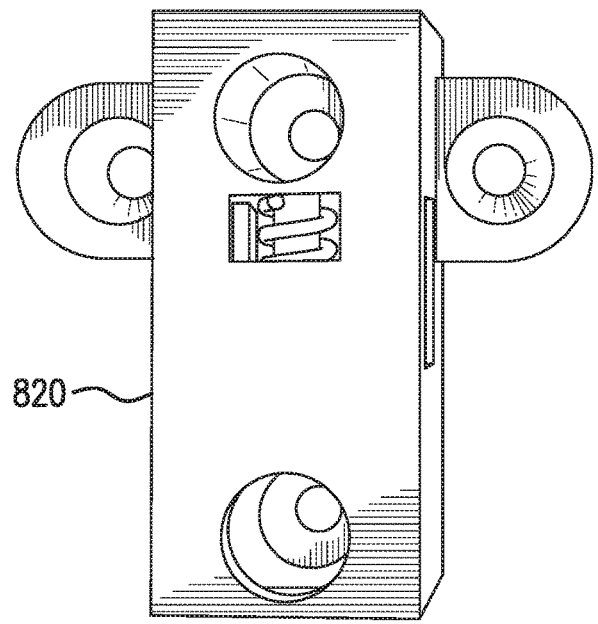
Figure 18:
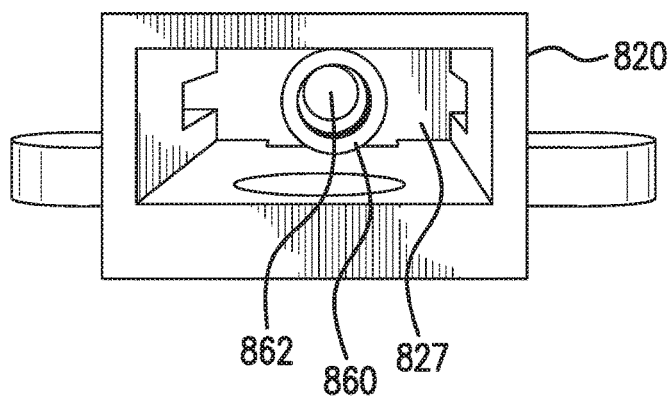
FIG. 18 is a top view of the fixed first member of the bracket of FIG. 13.
Figure 20:
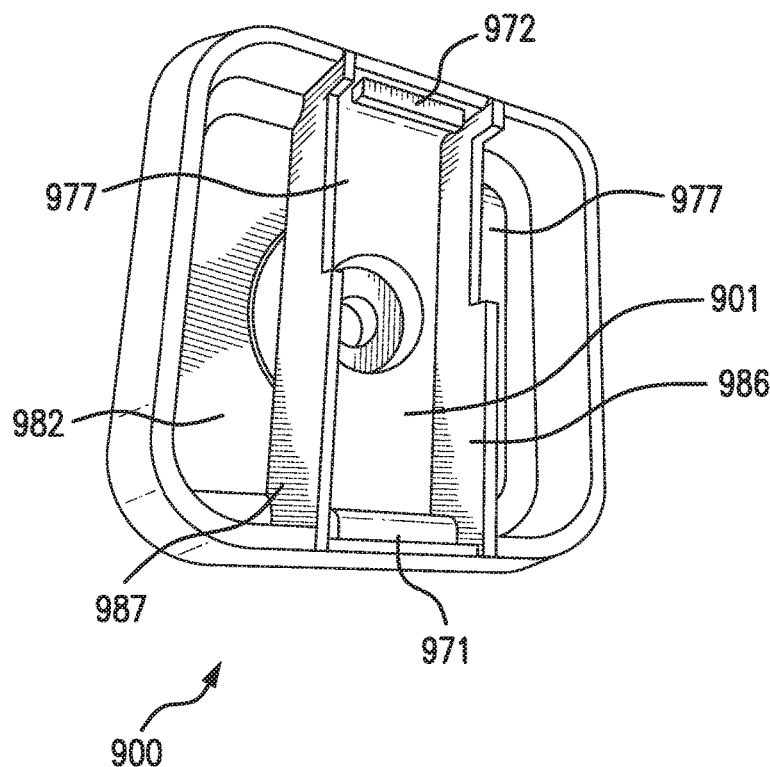
FIG. 20 is a perspective view showing a rear of the cover of FIG. 19.

The fixed first member 820 includes a post 862 on which the spring 860 sits. Like the bracket 10 in FIG. 1, the fixed first member 820 also includes a mounting member 850 extending from one side of the fixed first member 820. Like the bracket 410 in FIG. 11A, the fixed first member 820 likewise includes a mounting screw opening 851 in the bracket housing. The descriptions of the mounting member 50 and mounting screw opening 451 above also apply to the mounting member 850 and mounting screw opening 851 and will not be repeated for the sake of brevity. The fixed first member 820 further includes a slot 812 for receiving at least a portion, preferably in the form of a protrusion or extension 822, of the movable second member 830, the protrusion 822 also serving as a stop member 822 for preventing further movement of the movable second member 830 once it reaches a certain predetermined point, such as at wall member 835 of the slot 812 which is one end of the slot 812 as shown in FIGS. 14 and 16. FIG. 18 shows a top view of the fixed first member 820. The top view illustrates an internal cavity 827 to receive the movable second member 830. The top view also shows the spring 860 and post 862. The fixed first member 820 also includes a cavity 824 to receive a phlange 972 which is shown in FIG. 20 of a cover 900. The entrance to the internal cavity 827 is on one end of the fixed first member 820 and the cavity 824 is on another end (opposite end) of the fixed first member 820.

The movable second member 830 includes a plurality of legs 832 with each carrying a protrusion 822 that travels in slot 812. The movable second member 830 also includes an opening 863 to accommodate a screw inserted through the mounting screw opening 851. The opening 863 can accommodate the screw in either the initial, biased position or the compressed position and the movement of the second member 830 is not interfered by the screw. The legs 832 also define a region 854 to accommodate the spring 860. The movable second member 830 is biased toward the first or initial position via a surface 856 of the region 854. The movable second member 830 is movable toward the fixed first member 820 by at least partially overcoming the biasing force of the spring 860. The movable second member 830 overcomes the biasing force via the surface 856 of the region 854 to reduce the distance between the first and second members. The surface 856 connects the legs 832. In FIG. 13, the spring 860 and post 862 are between the legs 832 and the spring 860 is in contact with the surface 856 in the initial, biased position. The movable second member 830 also includes a cavity 833 to receive a phlange (971) of a cover (900). The cavity 833 is an area where force is applied to overcome the biasing force of the spring 860. The cavity 833 is on one end of the movable second member 830 and the protrusions 822 are located on another end (opposite end) of the movable second member 830. The cavities 824, 833 are on opposite ends of the bracket 810.

Figure 19:
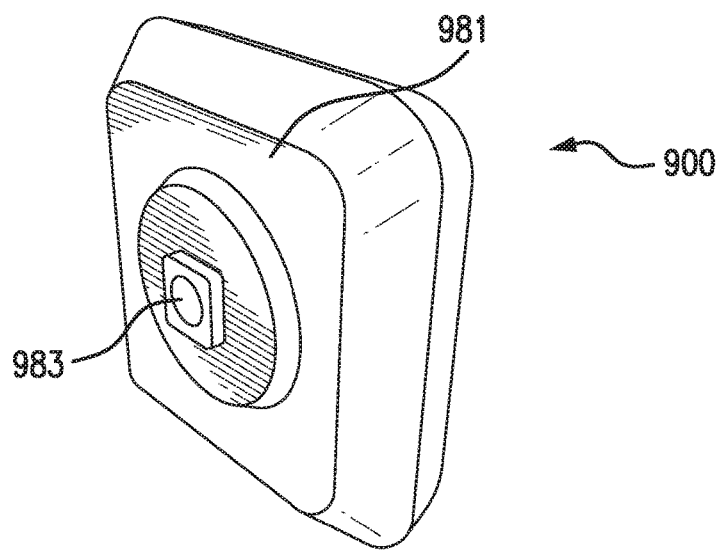
FIG. 19 is a perspective view showing a front of a cover of the present invention according to another embodiment of the present invention.

FIGS. 19-20 depict another illustrative cover 900. The cover 900 includes an upper or exterior surface 981, a lower or interior surface 982, and a mounting mechanism 983 for attaching a structure, which is configured for supporting, hanging or mounting an accessory, to the cover 900. The mounting mechanism 983 is formed on the upper surface 981 and includes a recess for receiving an end of a fixture or accessory. The recess extends through the cover 900. The mounting mechanism 983 is similar to the mounting mechanism 83 show in FIG. 3 and the description of the mounting mechanism 83 above also applies to the mounting mechanism 983. The structure which engages the mounting mechanism 983 may include, but is not limited to, a rod, a rod with a cap that includes a depression for receiving a bar, a rod with a cap that includes an aperture for receiving an arcuate or polygonal ring, or a wire, filament, rope or cable support.

Referring to FIG. 20 the lower surface 982 is shown in more detail. On the lower surface 982, the cover 900 includes a first lateral portion 986 and a second lateral portion 987. The cover 900 includes a recess 901 between the lateral portions which is sized and configured to snugly receive the bracket 810. Each of the lateral portions includes a cutout 977 to accommodate the respective mounting member 850 of the fixed first member 820. The location of the cutout 977 on the lateral portion can be determined based on the location of the mounting member 850 on the fixed first member 820. The recess of the mounting mechanism 983 is located at a position between the lateral portions. The cover 900 also includes a first phlange 971 to engage the cavity 833 of the movable second member 830 and a second phlange 972 to engage the cavity 824 of the fixed first member 820. The phlanges 971, 972 are located at a position between the lateral portions and are on opposite sides of the cover 900. The phlange 971 is located on one end of the recess 901 and the phlange 972 is located on another end of the recess 901.

Figure 21:
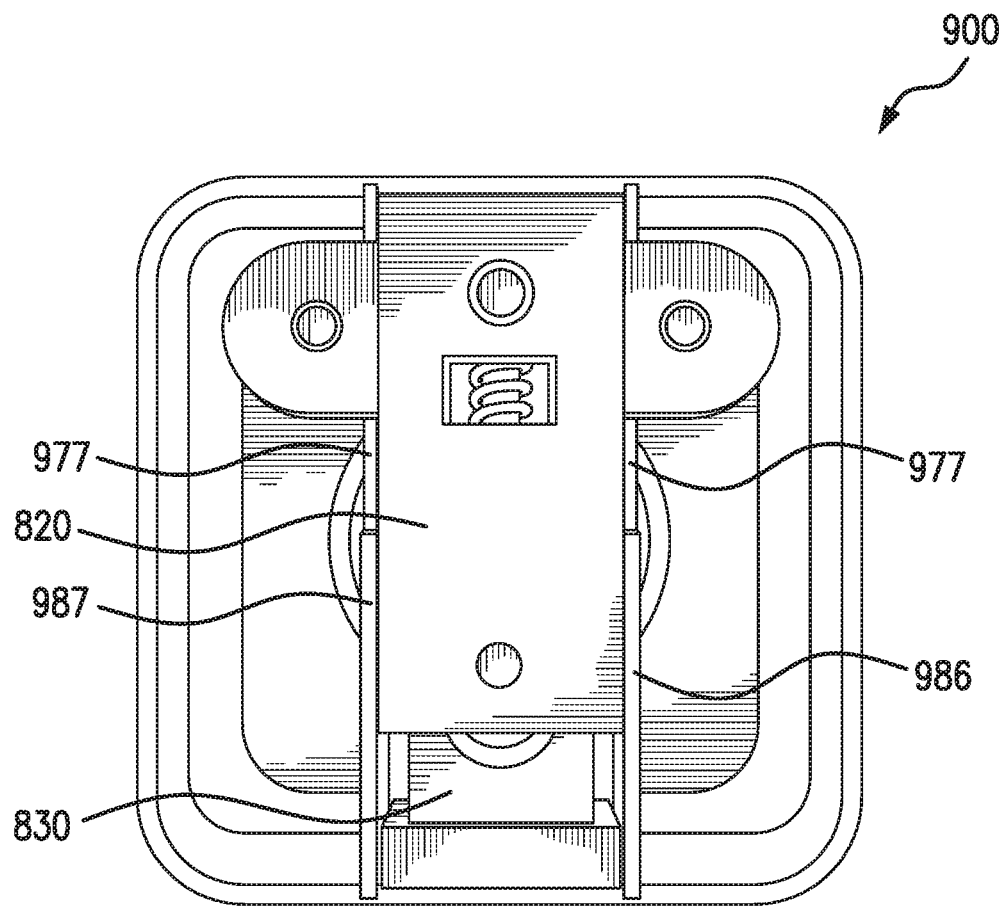
FIG. 21 is a rear view showing the bracket of FIG. 13 and the cover of FIG. 19 engaged.
Figure 22:
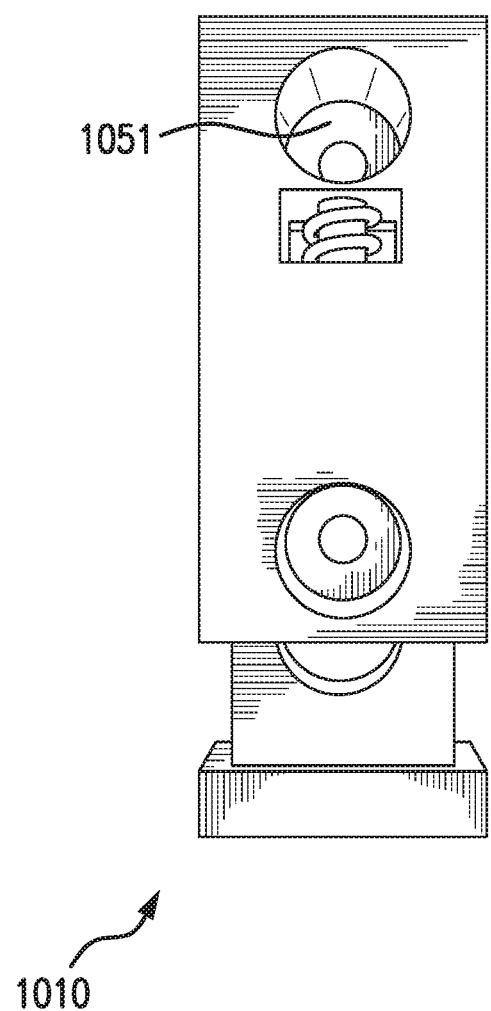
FIG. 22 is a front view showing a bracket of the present invention in an initial, biased position according to another embodiment of the present invention.
Figure 23:
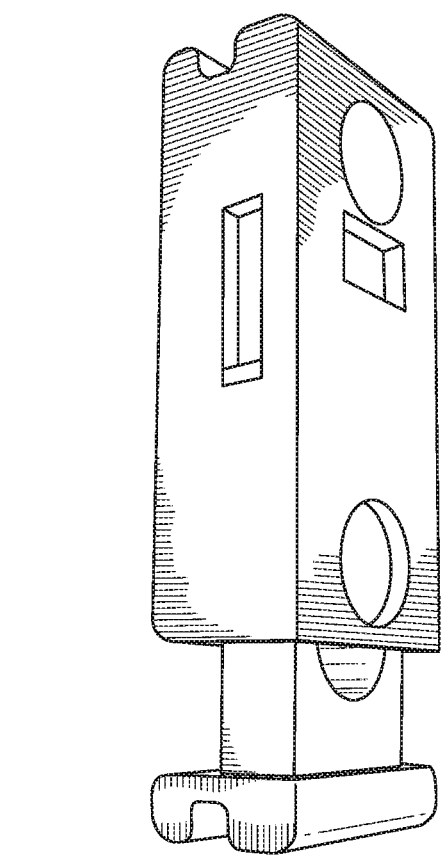
FIG. 23 is a front perspective view showing the bracket of FIG. 22.
Figure 24:
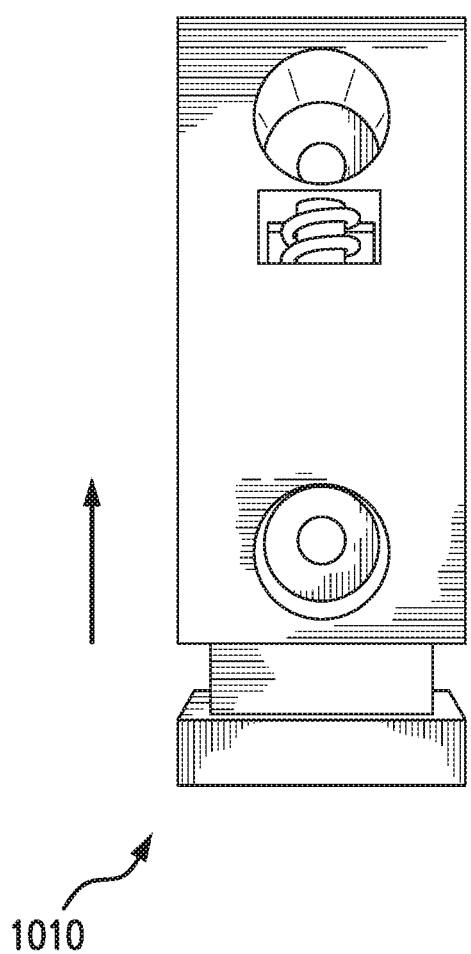
FIG. 24 is a front view of the bracket of FIG. 22 showing the movable second member overcoming the biasing force of the spring and moving towards the fixed first member.
Figure 25:
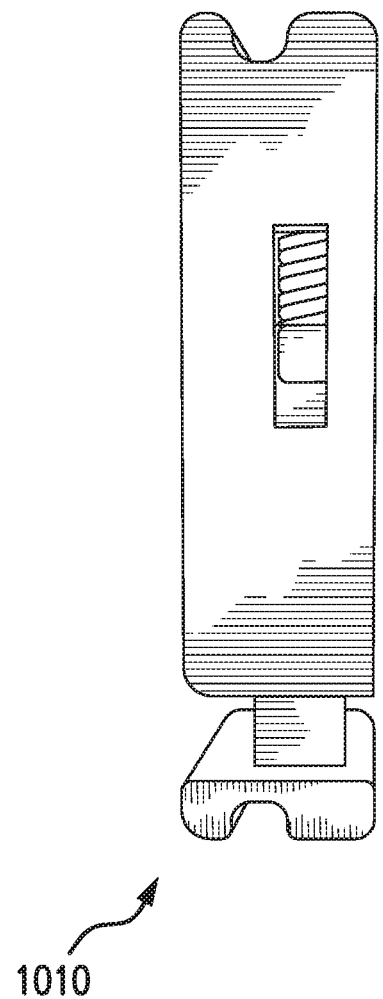
FIG. 25 is a side view of the bracket of FIG. 22 showing the movable second member overcoming the biasing force of the spring and moving towards the fixed first member.

FIG. 21 shows a rear view of the accessory mounting device when the bracket 810 and the cover 900 are engaged. The movable second member 830 is compressed toward the fixed first member 820 by the cover 900 to overcome the biasing force of the spring 860 and move the movable second member 830 towards the fixed first member 820.

Referring to FIGS. 22-27, another embodiment bracket 1010 of the present invention is shown. The structure and operation of the bracket 1010 is similar to the bracket 810 except that the bracket 1010 is without the mounting members 850. The bracket 1010 can be mounted on an installation surface by using openings 1051.

Figure 28:
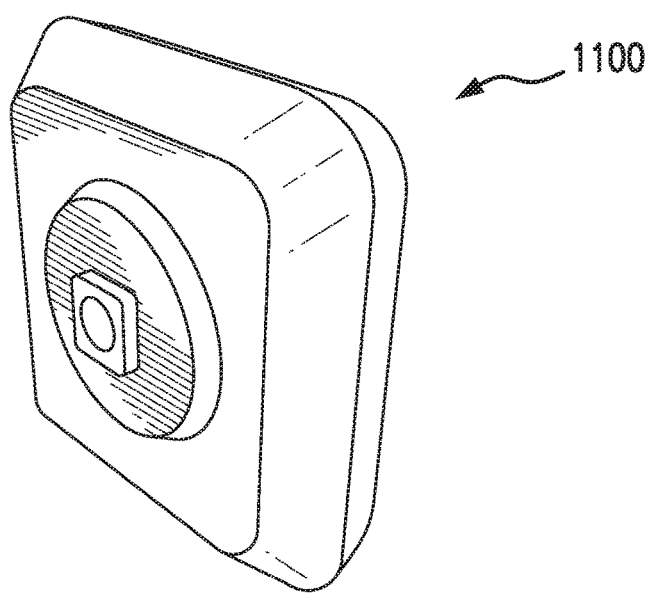
FIG. 28 is a perspective view showing a front of a cover of the present invention according to another embodiment of the present invention.
Figure 29:
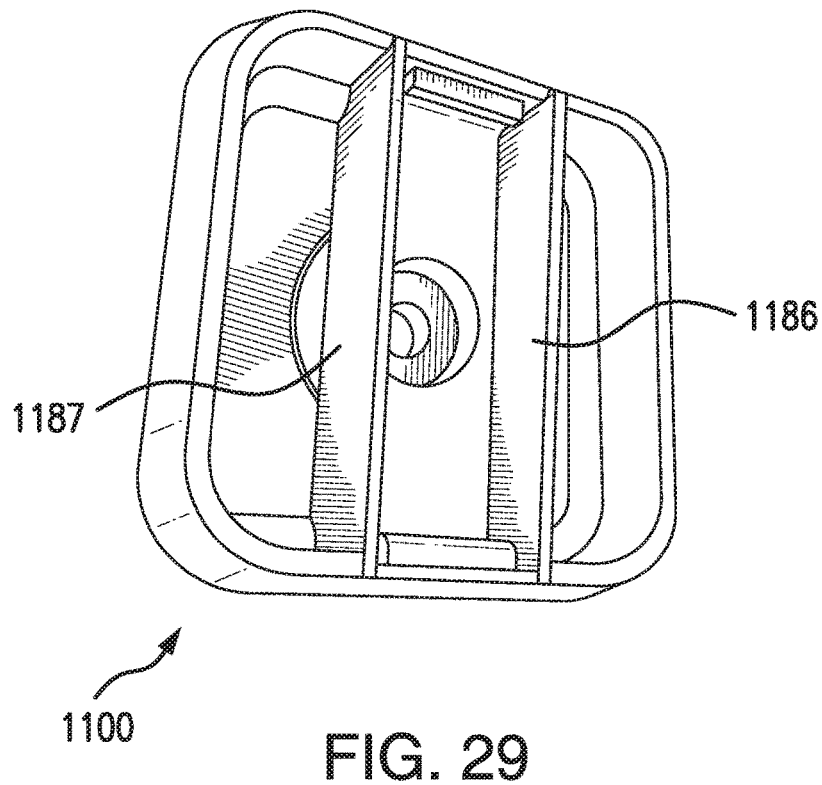
FIG. 29 is a perspective view showing a rear of the cover of FIG. 28.

FIGS. 28-29 depict another illustrative cover 1100. The structure and operation of the cover 1100 is similar to the cover 900 except that the lateral portions 1186, 1187 of the cover 1100 do not have cutouts 977. Each of the lateral portions 1186, 1187 extends from one side of the cover 1100 to another side (opposite side) of the cover 1100.

Figure 30:
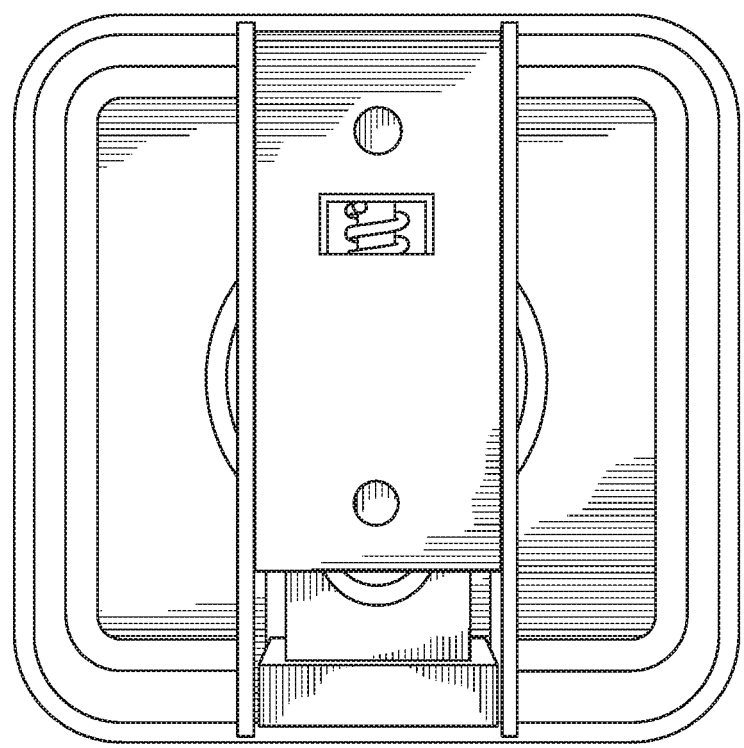
FIG. 30 is a rear view showing the bracket of FIG. 22 and the cover of FIG. 28 engaged.

FIG. 30 shows a rear view of the accessory mounting device when the bracket 1010 and the cover 1100 are engaged. Since the bracket 1010 does not have the mounting members 850, the cutouts 977 on the cover 1100 are unnecessary or optional. However, it is understood that the cover 900 (FIG. 20) may also be used to engage the bracket 1010 (FIG. 22) since the recess 901 and the phlanges 971, 972 can also fit on the bracket 1010.

The engagement or installation process of the bracket 810 and 1010 and the cover 900 and 1100 is similar to the method shown in FIGS. 20 and 21. The biasing force is overcome by pushing the phlange 971 onto the cavity 833. The biasing force of the spring 860 maintains each cavity of the bracket in contact with the respective phlange of the cover when the cover is secured to the bracket.

Figure 31:
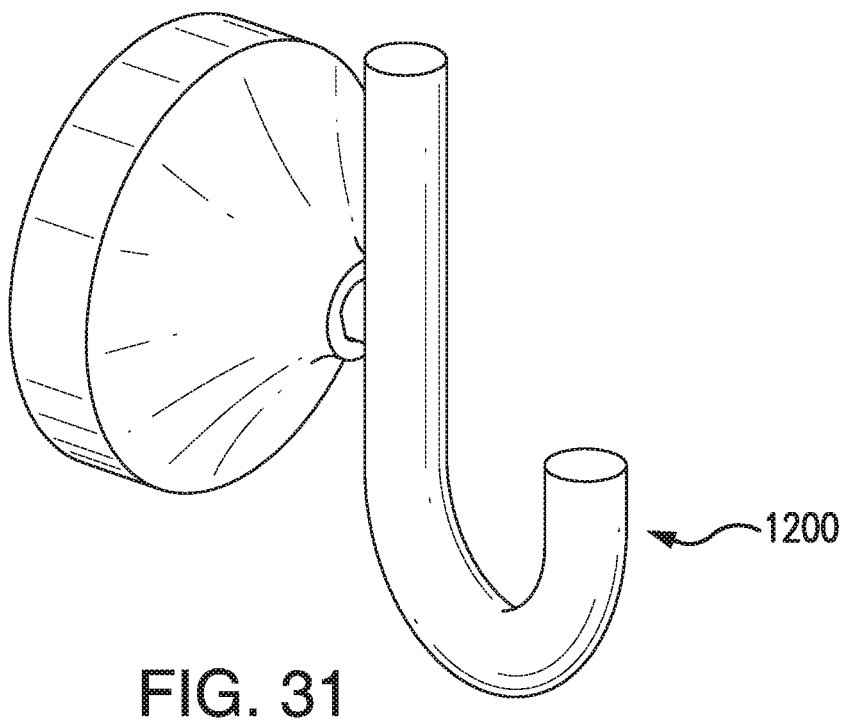
FIG. 31 is a perspective view showing a hook mounted to a cover of the present invention.
Figure 32:
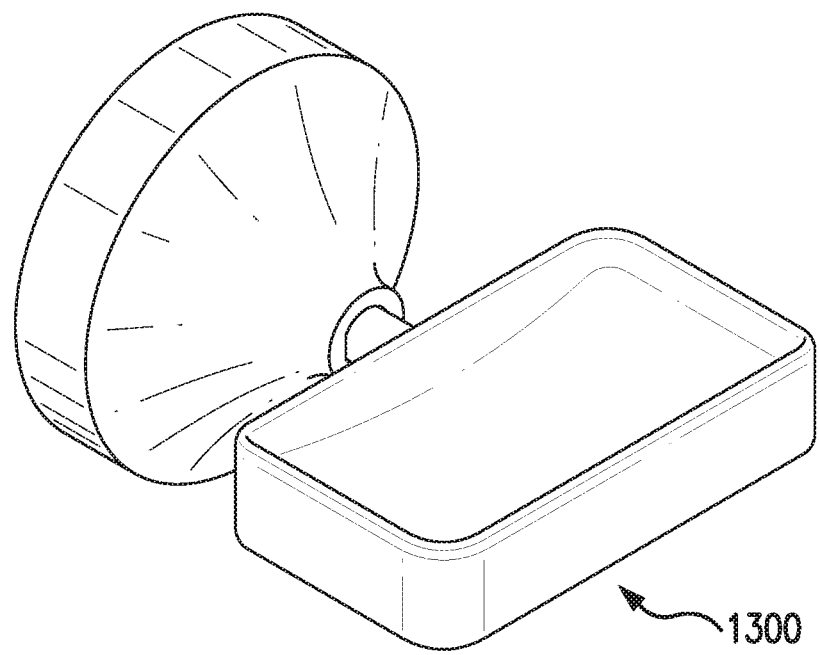
FIG. 32 is a perspective view showing a tray mounted to a cover of the present invention.

Referring to FIG. 31, an embodiment is shown in which a J-shaped hook 1200 is mounted to a cover. Referring to FIG. 32, an embodiment is shown in which a tray 1300 is mounted to a cover of the present invention. These two embodiments are only exemplary and many other types of fixtures and accessories may be easily and conveniently attached to the cover and mounting brackets of embodiments of the present invention.

Figure 33:
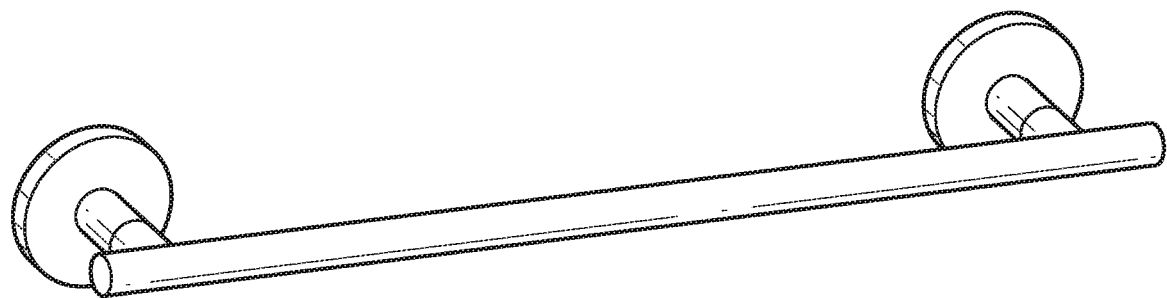
FIG. 33 is a perspective view showing a towel bar mounted to a cover and bracket according to the present invention.

Embodiments of the present invention has a wide variety of uses depending upon the outer cover portion configuration. As shown in FIG. 33, the covers can be configured with an opening for supporting a bar or rod that can be used to hang many different household items including towels, toilet paper, paper towels, shower curtains, blinds, or window treatments, or can be used to support other objects that are placed on the rod. Multiple rods can be spaced and used to support small appliances or other items in place of a shelf. The rods can be solid or can be configured to be partially collapsible with and internal spring to facilitate assembly into the mounted covers. The outer cover can also be designed as a hook, as shown in FIG. 31, or a protrusion which can be used to support anything that can hang on a hook or protrusion. This would include picture frames or signage, dart boards or other games, clothing, mirrors, tools, umbrellas or other items. The protrusion can also include a ring or other structure for supporting an item upon a wall or ceiling. The outer cover can also be configured to be a supporting member such as a soap dish, toothbrush holder, cup holder, small shelf or other items. The invention can be configured to be at the appropriate size, material, and strength to hold and support the items that will be placed upon it. The same is true of the size, strength, and number of springs used.

Figure 34:
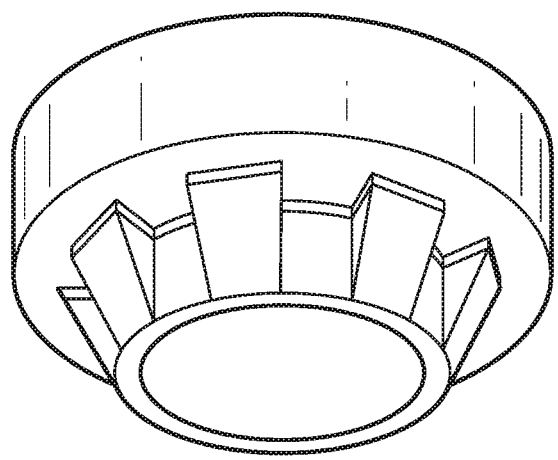
FIG. 34 is a perspective view showing a smoke detector mounted in a cover according to the present invention for attachment to a ceiling mounted bracket.

The outer cover can also be configured to enclose devices such as thermostats, LED lighting, clocks, carbon monoxide detectors, fire detectors, smoke alarms and the like to facilitate mounting of those items. FIG. 34 is an illustration of a ceiling mounted carbon dioxide or smoke monitor or detector that has a specially shaped cover for engaging any one of the brackets shown herein. When the monitor or detector needs to be hard wired, the bracket is configured to allow the wires to either pass through it or around it and into the cover.

Additional envisioned uses for the present invention include mounting of a belt rack, tie rack, chandelier, ceiling lamp, wardrobe rail, mop or broom caddy, shelf holder, grab bars, exercise bars, or handicap rails. The cover can be designed with sufficient structure for any of these applications and the bracket would also be sized accordingly to support the cover. The bracket can be mounted on a wall or ceiling surface or even on a door or window frame to support or provide the cover for mounting any of these different components.

Bracket consists of or consists essentially of one or more of the aforementioned bracket structures or components is also contemplated. Cover consists of or consists essentially of one or more of the aforementioned cover structures or components is also contemplated. Accessory mounting device consists of or consists essentially of a bracket and a cover is also contemplated. The bracket components and the cover components may also be provided as individual pieces to be assembled to create the bracket and the cover, respectively. The bracket, in an unassembled state, includes a spring that is without tension at a neural state. Bias force would exist when the spring is compressed or pulled away from neural state. The load on the spring, for example, is such that it can be compressed by hand without tools. The spring may be a coil spring, cantilever spring, volute spring, balance spring, leaf spring, V-spring, or other types of devices that can be compressed or pulled but returns to its former shape when released. The spring or the accessory mounting device supplies sufficient force to support an accessory and additional weight based on use.

The wall or other supporting surface on which the accessory mounting device is secured could be a flat surface or other surface. It may have a flat surface that abuts a surface the bracket that forms a tight fit and supports and fixes the accessory in place.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. An accessory mounting device comprising:
   a bracket having a fixed first member which includes a lower surface configured and dimensioned to conform to a wall or ceiling surface, the bracket having a movable second member spaced from the first member by a distance when in a first position, wherein:
   the second member is biased toward the first position by a biasing force of a spring but is movable toward the first member by at least partially overcoming the biasing force of the spring to reduce the distance between the first member and the second member;
   the second member includes a plurality of legs with each carrying a protrusion that acts as a stop member for preventing further movement of the second member beyond a predetermined point, said plurality of legs configured so as to not interfere with attachment of the first member through an aperture to the wall or ceiling, wherein the spring is positioned entirely between the plurality of legs; and
   the first member includes a plurality of slots with each receiving a corresponding protrusion on a leg of the plurality of the legs of the second member, wherein the first member further comprises an internal cavity for receiving therein the second member.

2. The device of claim 1, wherein compression of the spring moves the second member of the bracket to reduce the distance between the first and second members of the bracket.

3. The device of claim 1, wherein the lower surface of the first member of the bracket includes one or more apertures therein for receipt of a fastener to securely affix the bracket to the wall or ceiling.

4. The device of claim 1, wherein the first member includes a cavity to engage a flange of a cover and the second member includes a cavity to engage another flange of the cover.

5. The device of claim 1 further comprising:
   a cover that is operatively associated with the bracket, the cover having an upper surface, a lower surface, and a recess that receives an accessory, wherein the cover is attachable to the bracket by urging one side of the cover against the second member of the bracket to overcome the biasing force and reduce the distance between the first member of the bracket and the second member of the bracket so that the one side of the cover is positioned adjacent the second member of the bracket and another side of the cover is positioned adjacent the first member of the bracket when the cover is secured to the bracket, with the biasing force maintaining the cover in contact with the bracket.

6. The device of claim 4, wherein the cavity of the second member is further comprised of an internal channel located on a portion of a surface of the second member.

7. The device of claim 1, further comprising:
   a cover that is operatively associated with the bracket, the cover having an upper surface, a lower surface, and a recess that receives an accessory, the cover including a first lateral portion and a second lateral portion on the lower surface, a recess between the lateral portions which is sized and configured to snugly receive the bracket, a flange on one end of the recess to engage a channel on a portion of a surface of the first member, and another flange on another end of the recess to engage a channel on a portion on a surface of the second member.

8. The device of claim 7, wherein the cover is attachable to the bracket by urging one of the flanges of the cover against the channel on the second member to overcome the biasing force of the spring and reduce the distance between the first member and the second member so that the one of the flanges of the cover is positioned within the channel on the second member and is adjacent to the second member and the other one of the flanges is positioned within the channel on the first member and is adjacent the first member when the cover is secured to the bracket, with the biasing force maintaining each cavity of the bracket in contact with the respective flanges of the cover when the cover is secured to the bracket.

9. The device of claim 7, wherein the lateral portions comprise a cutout to accommodate a mounting member of the first member.

10. The device of claim 1, wherein the first member further includes a mounting member extending from one side of the first member for receiving a fastener and another mounting member extending from another side of the first member for receiving another fastener.

11. The device of claim 1, wherein each of the protrusions on the legs of the second member is movable within the respective slot of the first member by overcoming the biasing force.

12. The device of claim 1, wherein the slot of the first member includes a wall member and the protrusion on the leg of the second member contacts the wall member to prevent further movement of the second member beyond the predetermined point.

13. The device of claim 1, wherein the first member further includes a post and the spring sits on the post.

14. The device of claim 1, wherein the second member further includes an opening to accommodate a fastener in both the first position and a compressed position.

15. The device of claim 14, wherein the first member further includes an opening to receive the fastener.

16. The device of claim 1 further comprising:
a cover that is operatively associated with the bracket, the cover having an upper surface, a lower surface, and a recess that receives an accessory, the cover including a first lateral portion and second lateral portion on the lower surface, a recess between the lateral portions which is sized and configured to snuggly receive the bracket, one or more cavities on the cover configured to engage a flange on a portion of a surface of the second member to overcome the biasing force of the spring and reduce the distance between the first member and the second member so that one of the cavities of the cover is positioned adjacent the flange on the second member and a flange of the first member is positioned within another one of the cavities of the cover and is adjacent to the first member when the cover is secured to the bracket, with the biasing force maintaining each flange of the bracket in contact with the respective cavities of the cover when the cover is secured to the bracket.

17. The device of claim 1 further comprising:
a cover that is operatively associated with the bracket, the cover having an upper surface, a lower surface, and a recess that receives an accessory, the cover including a first lateral portion and second lateral portion on the lower surface, a recess between the lateral portions which is sized and configured to snuggly receive the bracket, a cavity on the cover configured to engage a flange on a portion of a surface of the second member to overcome the biasing force of the spring and reduce the distance between the first member and the second member so that the cavity of the cover is positioned adjacent the flange on the second member and a cavity on a portion of a surface of the first member is positioned within a flange of the cover and is adjacent to the cover when the cover is secured to the bracket, with the biasing force maintaining the bracket in contact with the cavity and flange of the cover when the cover is secured to the bracket.

18. The device of claim 1 further comprising:
a cover that is operatively associated with the bracket, the cover having an upper surface, a lower surface, and a recess that receives an accessory, the cover including a first lateral portion and second lateral portion on the lower surface, a recess between the lateral portions which is sized and configured to snuggly receive the bracket, a flange on the cover configured to engage a cavity on a portion of a surface of the second member to overcome the biasing force of the spring and reduce the distance between the first member and the second member so that the flange of the cover is positioned within the cavity on a portion of the surface of the second member and a flange on a portion of a surface of the first member is positioned within a cavity of the cover and is adjacent to the first member when the cover is secured to the bracket, with the biasing force maintaining the bracket in contact with the cavity and flange of the cover when the cover is secured to the bracket.

19. The device of claim 1, wherein the first member includes a channel on a surface of the first member that engages an elongated protrusion on an inner surface of a cover and the second member includes a channel on a surface of the second member that engages another elongated protrusion on the inner surface of the cover.

20. The device of claim 1, wherein the plurality of legs are distanced apart, the second member includes a hole along the center to accommodate a fastener, the first member and second member each have an outer surface that locks with a cover using opposing slots or channels.

21. The device of claim 20, wherein the outer surfaces of the first and second members are horizontal to each other.

22. The device of claim 20, wherein the opposing slots or channels are U-shaped so as to engage flanges on the cover on three sides.

23. The device of claim 22, wherein one of the flanges on the cover is rectangular in shape.

24. The device of claim 1, wherein the internal cavity consists of a plurality of walls enclosing the first member.

* * * * *